United States Patent
Chen et al.

(10) Patent No.: US 10,198,368 B2
(45) Date of Patent: Feb. 5, 2019

(54) SOLID STATE DRIVE CONTROL DEVICE AND METHOD

(71) Applicant: REALTEK SEMICONDUCTOR CORPORATION, Hsinchu (TW)

(72) Inventors: Cheng-Yu Chen, New Taipei (TW); Chih-Ching Chien, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/602,787

(22) Filed: May 23, 2017

(65) Prior Publication Data
US 2017/0351624 A1 Dec. 7, 2017

(30) Foreign Application Priority Data
Jun. 1, 2016 (TW) .............................. 105117275 A

(51) Int. Cl.
G06F 13/10 (2006.01)
G06F 13/16 (2006.01)
G06F 13/42 (2006.01)
G06F 13/38 (2006.01)

(52) U.S. Cl.
CPC ........ *G06F 13/102* (2013.01); *G06F 13/1689* (2013.01); *G06F 13/382* (2013.01); *G06F 13/4282* (2013.01); *G06F 2213/0026* (2013.01); *G06F 2213/0032* (2013.01)

(58) Field of Classification Search
CPC ............... G06F 13/102; G06F 13/1689; G06F 13/4282; G06F 13/382; G06F 2213/0026; G06F 2213/0032
See application file for complete search history.

(56) References Cited

U.S. PATENT DOCUMENTS

| | | | | |
|---|---|---|---|---|
| 7,664,902 B1* | 2/2010 | Chow | ................. | G06F 12/1416 710/301 |
| 8,043,099 B1* | 10/2011 | Ni | ......................... | H05K 5/0278 439/131 |
| 9,287,669 B2* | 3/2016 | Wu | ......................... | H01R 24/62 |
| 2011/0202790 A1* | 8/2011 | Rambo | ................. | G06F 3/0605 714/6.12 |
| 2014/0047288 A1* | 2/2014 | Lee | ..................... | G11C 11/4093 714/719 |
| 2015/0067226 A1* | 3/2015 | Iskandar | ............. | G06F 13/4031 710/309 |
| 2015/0244119 A1 | 8/2015 | Wu et al. | | |

OTHER PUBLICATIONS

PCI express M.2 specification, Nov. 27, 2012, p. 150, PCI-SIG.
Serial ATA international organization serial ATA revision 3.3, Feb. 2, 2016, pp. 1-2 and pp. 214-215, Serial ATA.

* cited by examiner

*Primary Examiner* — Nimesh G Patel
(74) *Attorney, Agent, or Firm* — WPAT, PC

(57) ABSTRACT

The present invention discloses a solid state drive (SSD) control device including: a multi-interface compatible physical layer circuit operable to generate a physical layer output signal according to a serializer/deserializer (SerDes) reception signal; an input/output (I/O) circuit operable to generate at least one terminal output signal according to signal variation of at least one terminal; and a processing circuit operable to make the solid state drive control device adapt to one of several interface types in accordance with the physical layer output signal and/or the at least one terminal output signal.

20 Claims, 6 Drawing Sheets

SOLID STATE DRIVE CONTROL DEVICE AND METHOD

BACKGROUND OF THE INVENTION

1. Field of the Invention

The present invention relates to interface detection technique, especially to a solid state drive control device and method capable of detecting the type of an interface.

2. Description of Related Art

A conventional solid state drive (SSD) interface is a Serial Advanced Technology Attachment (SATA) interface. However, since the transmission speed of a SATA interface gradually falls behind with the development of high speed transmission technology, some SSD uses a Peripheral Component Interconnect Express (PCI-Express) interface instead.

In order to increase compatibility, some SSD is made to support both a SATA interface and a PCI-Express interface. This kind of SSD sets the voltage level of a specific pin, so that a host is operable to detect the voltage level of the pin and appoint the configuration of a port connected to the SSD accordingly. However, after the host finishes the configuration of the port, if the operation mode of the SSD is changed from a first mode (e.g., SATA mode) to a second mode (e.g., a PCI-Express mode), or if the SSD is replaced by another SSD merely in support of the second mode, the host won't be aware of such change or replacement and won't change the configuration adaptively; as a result, the SSD or the another SSD won't be able to establish or keep a normal link between itself and the host. There is another case that the above-mentioned SSD operates under a predetermined mode (e.g., the foresaid first or second mode) by setting of the voltage level of the pin; however, a host connected to the SSD is incapable of detecting the pin while a port configuration appointed by the host for connecting the SSD is not compatible to the predetermined mode, and thus the SSD is not able to be linked up with the host normally.

People who are interested in the prior art may refer to the following literatures:
(1) "*PCI Express M.2 Specification*", Revision 0.7, Version 1.0, Nov. 27, 2012, PP. 150 (pin 69 PEDET).
(2) "*Serial ATA Revision* 3.3", Gold Revision, Feb. 2, 2016, PP. 214 (pin position 69 [Config_1]) & PP. 215 (Table 27).

SUMMARY OF THE INVENTION

In consideration of the problems of the prior art, an object of the present invention is to provide a solid state drive (SSD) control device and method capable of executing interface detection by a device side, so as to make improvements over the prior art.

The present invention discloses an SSD control device compatible to multiple types of interface. An embodiment of the SSD control device comprises a multi-interface compatible physical layer circuit, an input/output (I/O) circuit and a processing circuit. The multi-interface compatible physical layer circuit is configured to generate a physical layer output signal according to a serializer/deserializer (SerDes) reception signal. The input/output (I/O) circuit is configured to generate at least one terminal output signal according to signal variation of at least one terminal. The processing circuit is configured to adapt an operation mode of the SSD control device to one of the multiple types of interface in accordance with at least one of the physical layer output signal and the at least one terminal output signal.

The present invention also discloses an SSD control method. An embodiment of the SSD control method is carried out by an SSD control device, and allows the SSD control device to be compatible to multiple types of interface. The SSD control method comprises the following steps: generating a physical layer output signal according to a reception signal; generating at least one terminal output signal according to signal variation of at least one terminal; and adapting an operation mode of the SSD control device to one of the multiple types of interface in accordance with at least one of the physical layer output signal and the at least one terminal output signal.

These and other objectives of the present invention will no doubt become obvious to those of ordinary skill in the art after reading the following detailed description of the exemplary embodiments that are illustrated in the various figures and drawings.

DETAILED DESCRIPTION OF THE PREFERRED EMBODIMENTS

The following description is written by referring to terms acknowledged in this industrial field. If any term is defined in this specification, such term should be explained accordingly.

The present disclosure includes a solid state drive (SSD) control device and method. On account of that some element of the SSD control device could be known, the detail of such element will be omitted provided that the present disclosure is still in compliance with the written description and enablement requirements. In addition, the SSD control method can be in the form of firmware and/or software which can be carried out by the SSD control device of the present invention or the equivalent thereof.

Figure 1:
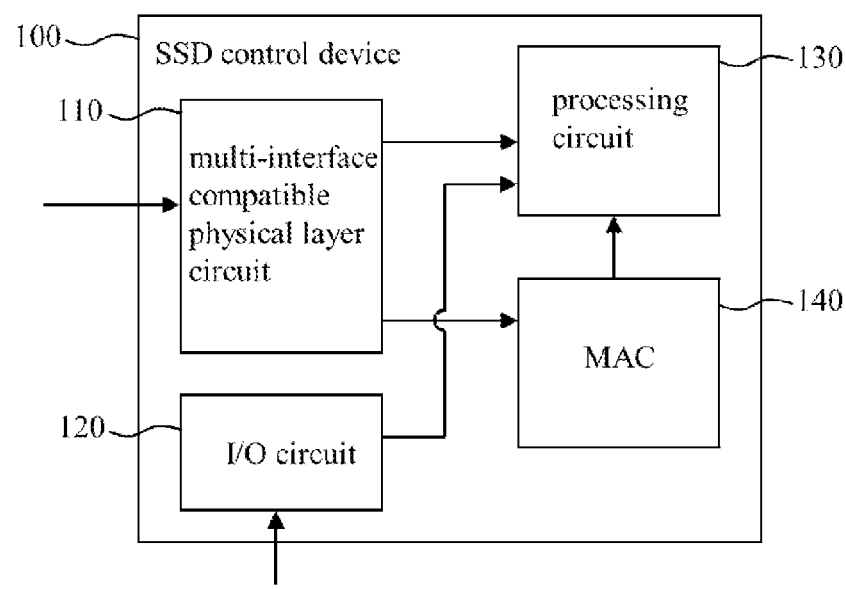
FIG. 1 illustrates an embodiment of the SSD control device of the present invention.

Please refer to FIG. 1. FIG. 1 illustrates an embodiment of the SSD control device of the present invention. The SSD control device 100 of FIG. 1 is compatible to multiple types of interface, and includes the physical layers and protocol layers of the multiple types of interface. Each of the protocol layers, such as a data link layer and a data transaction layer, is above a physical layer. The multiple types of interface are a type of Peripheral Component Interconnect Express (PCI-Express) interface, a type of Serial Advanced Technology Attachment (SATA) interface, etc.; however, these types of interface are examples for understanding, not for limiting the scope of the present invention.

As shown in FIG. 1, the SSD control device 100 comprises: a multi-interface compatible physical layer circuit 110, an input/output (I/O) circuit 120, a processing circuit 130, and a media access control (MAC) circuit 140.

Please refer to FIG. 1. The multi-interface compatible physical layer circuit 110 includes the physical layers of the aforementioned multiple types of interface, and is configured to output a physical layer output signal in accordance with a reception signal. In this embodiment, the reception signal is a serializer/deserializer (SerDes) reception signal. Since SerDes technology is well known in this industrial field and capable of converting a single-ended bus signal of large bit width into one or more differential signal(s) of the frequency higher than the frequency of the single-ended bus signal, the SerDes reception signal should be deemed well defined rather than undefined to those of ordinary skill in the art. It should be noted that the implementation of the present invention is not limited to SerDes technology.

Please refer to FIG. 1. The I/O circuit 120 is configured to generate at least one terminal output signal according to signal variation of at least one terminal (e.g., at least one pin). In this embodiment, the amount of the at least one terminal is equal to the amount of the at least one terminal output signal; more specifically, N different terminal output signals will be transmitted through N different terminals respectively, in which N is an integer greater than one. In addition, the at least one terminal output signal in this embodiment is transmitted without passing through the physical layer circuit 110; in other words, the SSD control device 100 separately receives the at least one terminal output signal and the SerDes reception signal through different pins.

Please refer to FIG. 1. The processing circuit 130 could be a microprocessor or the equivalent thereof, and is configured to adapt an operation mode of the SSD control device 100 to one of the aforementioned multiple types of interface according to at least one of the physical layer output signal and the at least one terminal output signal (i.e., according to the physical layer output signal and/or the at least one terminal output signal). The operation of the processing circuit 130 will be explained in later paragraphs in detail.

Please refer to FIG. 1. The MAC circuit 140 is coupled with the physical layer circuit 110 and the processing circuit 130, and is configured to provide an addressing function and a function of access control. Although the MAC circuit 140 is necessary for the SSD control device 100, it is not directly involved with the implementation of the present invention.

Figure 2:
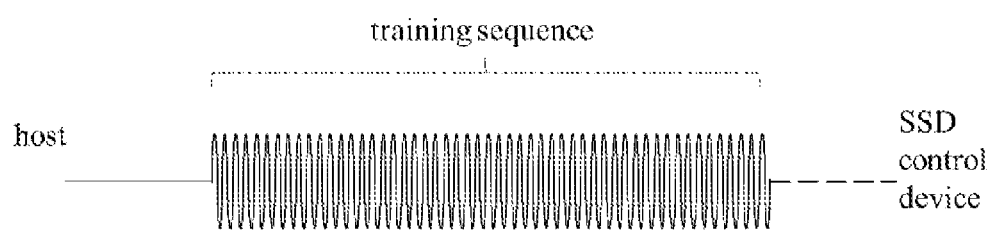
FIG. 2 illustrates the present invention detecting a SerDes reception signal complying with a specification of PCI-Express.
Figure 3:
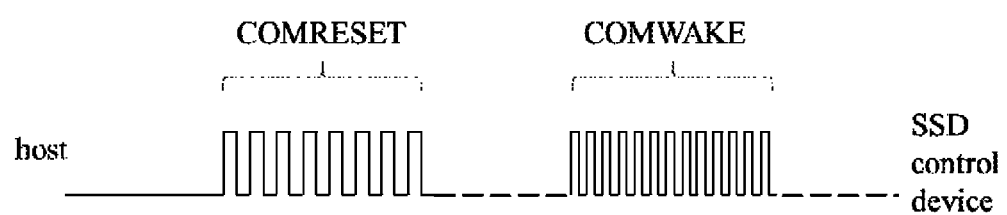
FIG. 3 illustrates the present invention detecting a SerDes reception signal complying with a specification of SATA.
Figure 4:
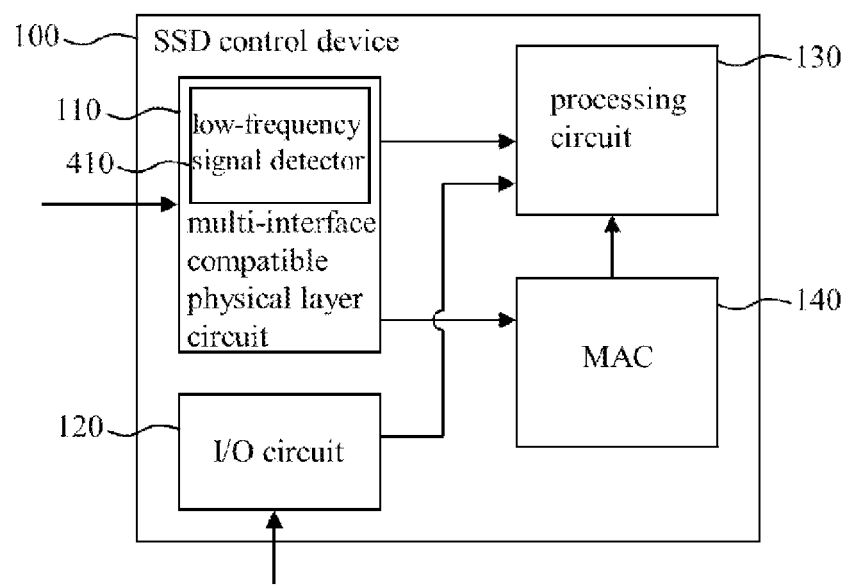
FIG. 4 illustrates another embodiment of the SSD control device of the present invention.

On the basis of the above, in an embodiment the processing circuit 130 determines the operation mode of the SSD control device 100 according to the physical layer output signal. For instance, the SSD control device 100 is compatible to both a SATA interface and a PCI-Express interface. If a host appoints a port connected to the SSD control device 100 as a port of SATA or PCI-Express interface, since the characteristic of a transmission signal of a SATA interface during its link establishment stage is different from the characteristic of a transmission signal of a PCI-Express interface during its link establishment stage, the SSD control device 100 is capable of recognizing the configuration of the port by detecting the characteristic of the transmission signal from the host, and accordingly chooses a mode for operation. In detail, if the said host transmits a SerDes signal complying with a specification of PCI-Express during a link establishment stage, the SerDes signal will be an in-band signal of a frequency complying with the PCI-Express specification, e.g., a training sequence of a frequency being 2.5 GHz as shown in FIG. 2; therefore, the physical layer circuit 110 will generate the aforementioned physical layer output signal according to the in-band signal so that the processing circuit 130 can determine whether the physical layer output signal complies with the specification of PCI-Express according to at least one of the following means: comparison with respect to signal frequency, detection of signal voltage level change, detection of the average of signal voltage level, etc. On the other hand, if the said host transmits a SerDes signal complying a specification of SATA during a link establishment stage, the SerDes signal will be an out-of-band (OOB) signal of a frequency complying with the SATA specification, e.g., a COMRESET, COMINIT, or COMWAKE signal of a low frequency as shown in FIG. 3; therefore the physical layer circuit 110 will use a low-frequency signal detector (LFD) 410 as shown in FIG. 4 to generate the aforementioned physical layer output signal according to the low-frequency OOB signal, and thus the processing circuit 130 can determine whether the physical layer output signal complies with the specification of SATA accordingly. It should be noted that the frequency of the said in-band signal (e.g., several GHz) is generally higher than 1 GHz, and the frequency of the OOB signal (e.g., hundreds of KHz~several MHz) is generally lower than 1 GHz. It should also be noted that the SSD control device 100 is able to transmit signals to the aforementioned host; however, this operation has little to do with the feature of the present embodiment, and thus the detail is omitted.

Figure 5:
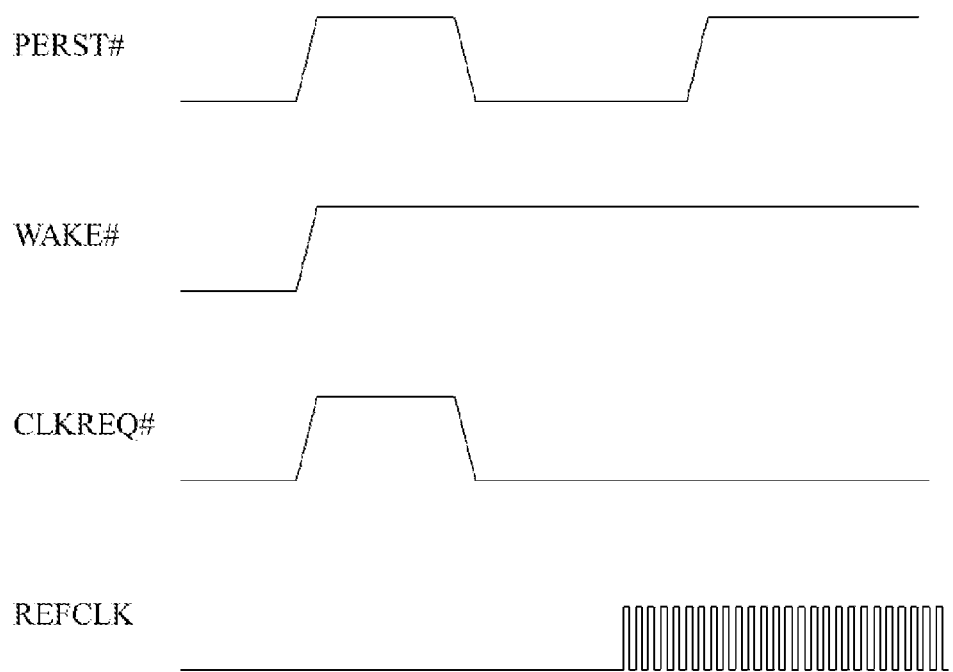
FIG. 5 shows a waveform diagram of a terminal output signal complying with a specification of PCI-Express.

In another embodiment, the processing circuit 130 determines the operation mode of the SSD control device 100 according to the at least one terminal output signal. For instance, the SSD control device 100 is compatible to both a SATA interface and a PCI-Express interface. If a host appoints a port connected to the SSD control device 100 as a port of SATA or PCI-Express interface, since the signal transmission of a SATA interface does not require the at least one terminal output signal while the signal transmission of a PCI-Express interface requires the at least one terminal output signal, the at least one terminal output signal through the SATA interface will be kept unchanged while the at least one terminal output signal through the PCI-Express interface will change by a specific pattern, and thus the SSD control device 100 can recognize the configuration of the port by receiving and detecting the transmission signal from the host through the aforementioned at least one terminal, and thereby choose a mode for operation. In detail, if the at least one terminal output signal complies with a specification of PCI-Express, the at least one terminal output signal could be, for example, a side-band signal including at least one of a reset signal (PERST#), a wake-up signal (WAKE#), a clock request signal (CLKREQ#) and a reference clock signal, in which the symbol "#" stands for "low enable" (i.e., a low level of a signal indicating an enabled state). After the SSD control device 100 is connected with a host, the waveforms of the reset signal, the wake-up signal, the clock request signal and the reference clock signal are shown in FIG. 5. Accordingly, the processing circuit 130 can find out the foresaid port is appointed as a port of a PCI-Express interface according to at least one of the following means: comparison with respect to signal frequency, detection of signal voltage level change, detection of the average of signal voltage level, etc. However, if the port is appointed as a port of a SATA interface, the waveform of the at least one terminal output signal won't change, and thereby the processing circuit 130 can find out that the at least one terminal output signal does not comply with a specification of PCI-Express and then determine that the SSD control device 100 should operate under a SATA mode.

Please refer to FIG. 5. In an embodiment, the processing circuit 130 detects whether the level of the reset signal is pulled high, and afterwards detects whether "the level of the reset signal is pulled down by a host terminal and thereby asserted", so as to generate a detection result, determine that the at least one terminal output signal complies with a specification of PCI-Express when the detection result is affirmative, and determine that the at least one terminal output signal does not comply with the specification of PCI-Express when the detection result is negative. In another embodiment, the processing circuit 130 detects whether the level of the clock request signal is pulled high, and afterwards detects "whether the level of the clock request signal is pulled down by the SSD control device 100 and thereby asserted", so as to generate a detection result, determine that the at least one terminal output signal complies with a specification of PCI-Express when the detection result is affirmative, and determine that the at least one terminal output signal does not comply with the specification of PCI-Express when the detection result is negative. In a further embodiment, the processing circuit 130 detects the level variation of the clock request signal and detects whether the reference clock signal exists, so as to determine that the at least one terminal output signal complies with a specification of PCI-Express when the level variation and the existence of the clock request signal are affirmative; in this embodiment, the SSD control device 100 comprises a clock generating circuit (not shown in the figures) configured to generate an operation clock according to the reference clock signal (e.g., a clock signal of 100 MHz) from a host, so that the SSD control device 100 can operate under a PCI-Express mode according to the operation clock; it should be noted that a specification of SATA adopts an embedded clock signal and thus the above-mentioned independent reference clock signal is not necessary here. In a further embodiment, the processing circuit 130 detects whether the level of at least one of the reset signal, the wake-up signal and the clock request signal is pulled high, so as to generate a detection result, determine that the at least one terminal output signal complies with a specification of PCI-Express when the detection result is affirmative, and determine that the at least one terminal output signal does not complies with the specification of PCI-Express when the detection result is negative.

Figure 6:
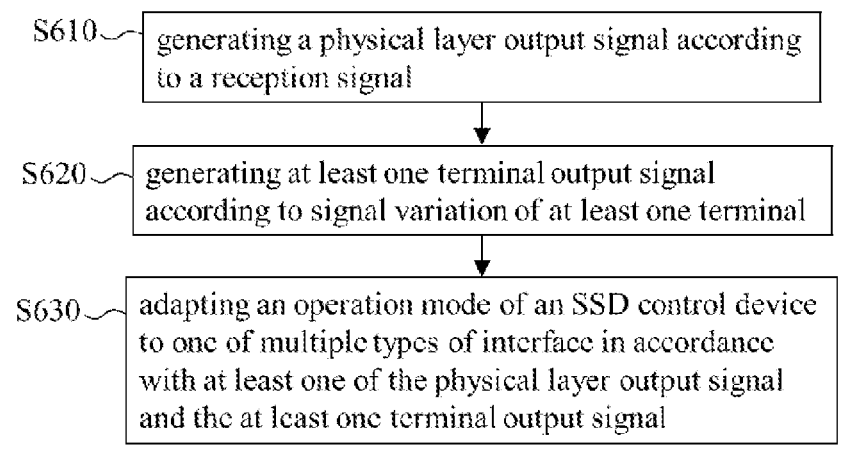
FIG. 6 illustrates an embodiment of the SSD control method of the present invention.

In addition to the fore-disclosed SSD control device 100, the present disclosure further includes an SSD control method that is carried out by the aforementioned SSD control device 100 or the equivalent thereof. An embodiment of the control method is shown in FIG. 6 and capable of adapting an SSD control device to multiple types of interface, and comprises the following steps:

Step S610: generating a physical layer output signal according to a reception signal. This step can be executed by the multi-interface compatible physical layer circuit 110 of FIG. 1 or the equivalent thereof.

Step S620: generating at least one terminal output signal according to signal variation of at least one terminal. This step can be executed by the I/O circuit 120 of FIG. 1 or the equivalent thereof.

Step S630: adapting an operation mode of the SSD control device to one of the multiple types of interface in accordance with at least one of the physical layer output signal and the at least one terminal output signal. This step can be executed by the processing circuit 130 of FIG. 1 or the equivalent thereof.

Since those of ordinary skill in the art can appreciate the detail and modification of the method embodiment by referring to the description of the fore-disclosed device embodiments, which means that each feature of the device embodiments can be applied to the method embodiment in a reasonable way, therefore repeated and redundant description is omitted. It should be noted that although the most embodiments of the present disclosure take SATA and PCI-Express interfaces, people of ordinary can appreciate how to modify the SSD control device and method to make them compatible to more kinds or other kinds of interfaces according to the present disclosure and the specifications of the said other kinds of interfaces. These and other reasonable modifications pertain to the scope of the present invention.

In summary, the SSD control device and method of the present invention allow a device (in relation to a host) to carry out interface detection, which not only prevents the problems of the prior art, but also features low implementation cost and high applicability.

The aforementioned descriptions represent merely the exemplary embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A solid state drive (SSD) control device compatible to multiple types of interface, the SSD control device comprising:
   a multi-interface compatible physical layer circuit configured to generate a physical layer output signal according to a serializer/deserializer (SerDes) reception signal and output the physical layer output signal to a processing circuit, in which a frequency of the SerDes reception signal is higher than hundreds of kHz;
   an input/output (I/O) circuit configured to transmit at least one terminal output signal to the processing circuit through at least one terminal without passing through the multi-interface compatible physical layer circuit; and
   the processing circuit configured to adapt an operation mode of the SSD control device to one of the multiple types of interface in accordance with at least one of the physical layer output signal and the at least one terminal output signal.

2. The SSD control device of claim 1, wherein the multiple types of interface include a type of Peripheral Component Interconnect Express (PCI-Express) and a type of Serial Advanced Technology Attachment (SATA).

3. The SSD control device of claim 1, wherein the SerDes reception signal includes one of an in-band signal and an out-of-band (OOB) signal.

4. The SSD control device of claim 3, wherein the in-band signal complies with a specification of PCI-Express, and the OOB signal complies with a specification of SATA.

5. The SSD control device of claim 4, wherein a frequency of the in-band signal is above 1 GHz, and a frequency of the OOB signal is below 1 GHz.

6. The SSD control device of claim 5, wherein the multi-interface compatible physical layer circuit includes a low-frequency signal detecting circuit configured to detect the OOB signal.

7. The SSD control device of claim 1, wherein a waveform of the at least one terminal output signal changes when the at least one terminal output signal complies with a specification of PCI-Express and the waveform of the at least one terminal output signal does not change when the at least one terminal output signal does not comply with the specification of PCI-Express.

8. The SSD control device of claim 7, wherein when the at least one terminal output signal complies with the specification of PCI-Express, the at least one terminal output signal includes at least one of follows: a reset signal, a wake-up signal, and a clock request signal.

9. The SSD control device of claim 8, wherein the processing circuit is configured to detect whether a level of the reset signal is pulled high, and afterward detect whether the level of the reset signal is pulled down by a host terminal and thereby asserted, so as to generate a detection result and determine whether the at least one terminal output signal complies with the specification of PCI-Express according to the detection result.

10. The SSD control device of claim 8, wherein the processing circuit is configured to detect whether a level of the clock request signal is pulled high, and afterward detect whether the level of the clock request signal is pulled down by the SSD control device and thereby asserted, so as to generate a detection result and determine whether the at least one terminal output signal complies with the specification of PCI-Express according to the detection result.

11. The SSD control device of claim 7, wherein the at least one terminal output signal includes a clock request signal and/or a reference clock signal.

12. The SSD control device of claim 11, wherein the processing circuit is configured to detect level variation of the clock request signal and/or detect whether the reference clock signal exists, so as to generate a detection result and determine whether the at least one terminal output signal complies with the specification of PCI-Express according to the detection result.

13. The SSD control device of claim 1, wherein the processing circuit is configured to detect whether a level of the at least one terminal output signal is kept unchanged, so as to generate a detection result and determine whether the at least one terminal output signal complies with a specification of PCI-Express according to the detection result.

14. A solid state drive (SSD) control method carried out by an SSD control device, the SSD control method allowing the SSD control device to be compatible to multiple types of interface, the SSD control method comprising:
  using a first circuit to output a physical layer output signal according to a reception signal, in which a frequency of the reception signal is higher than hundreds of kHz;
  using a second circuit to output at least one terminal output signal through at least one terminal without passing through the first circuit; and
  adapting an operation mode of the SSD control device to one of the multiple types of interface in accordance with at least one of the physical layer output signal and the at least one terminal output signal.

15. The SSD control method of claim 14, wherein the reception signal is one of follows: an in-band signal in compliance with a specification of PCI-Express, in which a frequency of the in-band signal is above 1 GHz; and an out-of-band (OOB) signal in compliance with a specification of SATA, in which a frequency of the OOB signal is below 1 GHz.

16. The SSD control method of claim 14, wherein a waveform of the at least one terminal output signal changes when the at least one terminal output signal complies with a predetermined type of specification and the waveform of the at least one terminal output signal does not change when the at least one terminal output signal does not comply with the predetermined type of specification; and when the at least one terminal output signal complies with the predetermined type of specification, the at least one terminal signal is at least one side-band signal and a low level of the at least one side-band signal indicates an enabled state.

17. The SSD control method of claim 16, wherein the at least one terminal output signal includes at least one of follows: a reset signal, a wake-up signal, and a clock request signal.

18. The SSD control method of claim 17, wherein the at least one terminal output signal is one of the reset signal and the clock request signal, and the step of adapting the operation mode further comprises: detecting whether a level of the reset signal is pulled high, and afterward detecting whether the level of the reset signal is pulled down and thereby asserted, so as to generate a detection result and determine whether the at least one terminal output signal complies with a specification of PCI-Express according to the detection result.

19. The SSD control method of claim 14, wherein the step of adapting the operation mode is carried out according to at least one of follows: a clock request signal of the at least one terminal output signal, and a reference clock signal of the at least one terminal output signal.

20. The SSD control method of claim 19, wherein the step of adapting the operation mode further comprises: detecting level variation of the clock request signal and/or detecting whether the reference clock signal exists, so as to generate a detection result and determine whether the at least one terminal output signal complies with a specification of PCI-Express according to the detection result.

* * * * *